United States Patent
Guo et al.

(10) Patent No.: US 8,891,022 B2
(45) Date of Patent: Nov. 18, 2014

(54) FAST-BOOTING BROADCAST TELEVISION RECEIVER

(75) Inventors: Shaori Guo, San Jose, CA (US); Zu Bing Yuan, San Jose, CA (US); Andrew J. Burstein, Pleasanton, CA (US)

(73) Assignee: Telegent Systems, Inc., Sunnyvale, CA (US)

( * ) Notice: Subject to any disclaimer, the term of this patent is extended or adjusted under 35 U.S.C. 154(b) by 553 days.

(21) Appl. No.: 12/853,085

(22) Filed: Aug. 9, 2010

(65) Prior Publication Data
US 2012/0033139 A1    Feb. 9, 2012

(51) Int. Cl.
*H04N 7/14*    (2006.01)
*H04N 21/443*    (2011.01)

(52) U.S. Cl.
CPC .............................. *H04N 21/4432* (2013.01)
USPC .............................. 348/725; 348/726; 725/25

(58) Field of Classification Search
CPC ....................................................... H04N 7/14
USPC ............ 348/E5.096, 725, 726; 725/151, 152, 725/25; 380/225
See application file for complete search history.

(56) References Cited

U.S. PATENT DOCUMENTS

| 5,838,383 A | 11/1998 | Chimoto et al. |
| 2007/0192549 A1 | 8/2007 | Oh |
| 2008/0098418 A1* | 4/2008 | Dabrowa et al. ................. 725/25 |
| 2008/0165288 A1* | 7/2008 | Miller ............................ 348/725 |
| 2008/0276284 A1 | 11/2008 | Bumgardner et al. |
| 2009/0028331 A1* | 1/2009 | Millar et al. ................... 380/255 |

FOREIGN PATENT DOCUMENTS

KR    1020070089399 A    8/2007

OTHER PUBLICATIONS

International Search Report for PCT/US2011/047135 filed on Aug. 9, 2011.
Written Opinion for PCT/US2011/047135 filed on Aug. 9, 2011.

* cited by examiner

*Primary Examiner* — Jefferey Harold
*Assistant Examiner* — Sihar Karwan
(74) *Attorney, Agent, or Firm* — Richard T. Ogawa; Ogawa P.C.

(57) ABSTRACT

Boot-up delay within a television receiver IC is substantially reduced by loading a portion of an operating program into the television receiver IC to enable execution of time-consuming receiver initialization operations, and then executing the receiver initialization operations concurrently with loading the remainder of the operating program into the television receiver IC. By this operation, the time required to execute the receiver initialization operations may be at least partly hidden under the time required to load the operating program, thereby substantially reducing the boot-up delay.

21 Claims, 3 Drawing Sheets

FAST-BOOTING BROADCAST TELEVISION RECEIVER

TECHNICAL FIELD

The present invention relates generally to the field of telecommunications and more particularly to broadcast television reception.

BACKGROUND

Broadcast television receiver ICs deployed within smartphones and other handheld devices typically remain un-powered until the user selects the television function, thus conserving precious battery power at the expense of receiver "boot-up" delay. Unfortunately, the boot-up delay tends to be substantial. First, cost/performance pressure typically dictates omission of non-volatile storage from the television receiver IC so that operating program code ("software") required by one or more on-chip processors must be loaded into the television receiver IC (e.g., from a separate flash memory or other non-volatile storage) before a broadcast television signal may be displayed. Further, to ensure maximum inter-operability with other components, the code-load interface tends to be a low-bandwidth serial interface (e.g., inter-integrated circuit ($I^2C$) or the like) so that even a relatively small amount of code may require several seconds to load (e.g., more than five seconds to load 128 kilobytes of program code via a 200 KHz $I^2C$ interface). Moreover, even after the program code is loaded, initialization of the television receiver functions required for signal reception, decoding and rendering typically consumes several more seconds. Making matters worse, even after the television receiver IC is fully initialized, yet further delay may be incurred awaiting critical rendering information within the incoming television signal itself (e.g., awaiting reception of a reference frame or "intra-frame" within a digital television broadcast). Overall, the delay between selection of the TV function (e.g., button or icon press in the user interface) and video display/audio output may be as long as 8-10 seconds, a frustratingly long time for many users.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In various embodiments disclosed herein, boot-up delay within a television receiver IC is substantially reduced by loading a portion of an operating program into the television receiver IC to enable execution of time-consuming receiver initialization operations, and then executing the receiver initialization operations concurrently with loading the remainder of the operating program into the television receiver IC. By this operation, the time required to execute the receiver initialization operations may be at least partly hidden under the time required to load the operating program, and vice-versa, thereby substantially reducing the boot-up delay.

Figure 1:
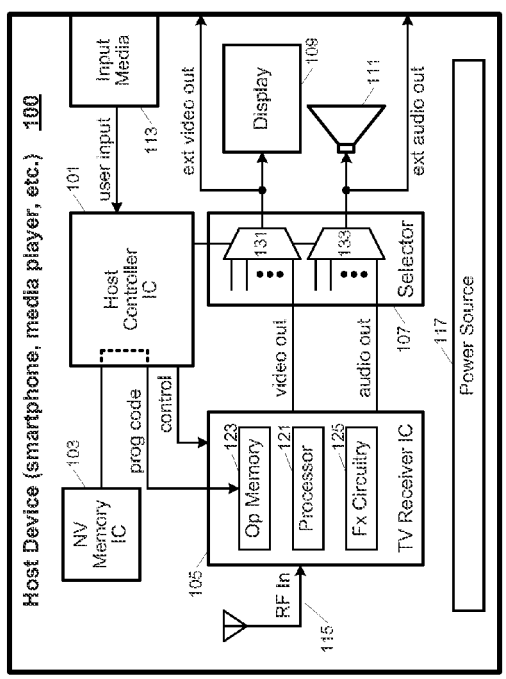
FIG. 1 illustrates an embodiment of a host device having a fast-booting television receiver IC.

FIG. 1 illustrates an embodiment of a host device or system 100 having a fast-booting television receiver IC 105. Host device 100 may be, for example and without limitation, a mobile telephone (including a so-called "smartphone"), media player (including a handheld television set), gaming device, tablet computer, or any other power-constrained system (including an energy-efficient wall or line-powered system) having a user-selectable television function. In the embodiment shown, host device 100 includes a host controller IC 101, non-volatile memory IC 103, television receiver IC 105, selector 107, display 109, speaker 111, input media 113, antenna 115 and power source 117. More or fewer components may be provided in accordance with the application and features of the host device. For example, a mobile telephone may include additional circuitry to enable telephone signal transmission and reception (e.g., power amplifier, signal processor, etc.), a media player or gaming device may include a removable-storage-media reader, and so forth. Moreover, each or any of the individual integrated circuits and/or functional components shown may be implemented by multiple integrated circuits or functional components (or, conversely, any two or more of the ICs shown may be integrated into a single IC, though cost considerations may come into play when combining circuit elements that require different fabrication processes). As an example, input media 113 may include, without limitation, a keypad (e.g., implemented by buttons, touch-screen or any other technology capable of detecting touch, motion, pressure, proximity, etc.), microphone, motion detector, orientation detector (e.g., compass), image/optical detector (e.g., charge-couple-device (CCD), infra-red detector or the like), thermometer, switches of various types and so forth. Similarly, power source 117 is generally referred to herein as a battery (e.g., a chargeable or non-rechargeable electric battery), but may alternatively or additionally include a solar or kinetically-based power source (and, as noted above may be omitted altogether in the case of a host device intended to be powered by wall power). Further, non-volatile memory 103 is assumed to be a flash memory, but may alternatively be a magnetoresistive memory or any other technology capable of retaining data (including operating program code for host controller 101, television receiver IC 105 and/or other component of the host device) in the absence of applied power. Also host controller 101, selector 107, display 109, speaker 111, and/or antenna 115 may include numerous functions beyond those specifically shown and described herein, and may be integrated with other aspects or components of host device 100. Similarly, any or all such components may be omitted if unnecessary within a given application and/or if the function served is provided by other components within host device 100 or by components external to the host device. As an example, integrated antenna 115, speaker 111, and/or display 109 (at least) may be omitted in favor of an external antenna, speaker and/or display coupled to host device 100 via cables or wireless signaling media.

In the embodiment shown, television receiver IC 105 remains powered off ("un-powered") until the operator of host device 100 (the "user") provides input indicating that the television function is to be enabled; an operation referred to herein as "selecting the television function." In the case of a smartphone or media player, for example, an icon for the television function may be presented on display 109 such that when the user touches (or presses or swipes) a touch-screen or other input media 113 in a manner that corresponds to the icon (e.g., touching the touch-screen in proximity to the icon), the user's intent to enable the television function is signaled to host controller 101 (e.g., via the signaling path designated "user input"). Later, when the user indicates that the television function is to be disabled (de-selected), host controller 101 takes action as necessary to power off television receiver IC 105 and thus reduce power consumption.

In one embodiment, television receiver IC 105, which includes an internal processor 121, operating memory 123, and functional circuitry 125, is deemed to be powered off whenever operating memory 123 is un-powered (thus resulting in loss of operating memory contents), though processor 121 and/or functional circuitry 125 may additionally be un-powered. In an embodiment in which television receiver IC 105 self-switches between powered and un-powered states in response to a control signal from host controller 101 (e.g., delivered via the "control" signal path shown), at least some circuitry within television receiver IC 105 may remain powered to effectuate the signal-responsive power-mode switching, even though the television receiver IC 105 is deemed to be un-powered. In an alternative embodiment, the power-mode switching (i.e., switching television receiver IC 105 between un-powered and powered states) may be effected by circuitry external to the television receiver IC (e.g., power-switching circuitry (not shown), responsive to signals from host controller 101 and/or input media 113. In the latter case, the television receiver IC may be completely powered off (i.e., no power applied to the IC) whenever the television function is de-selected.

Still referring to the embodiment of FIG. 1, the operating memory 123 is implemented by volatile memory (i.e., contents lost when un-powered) which is re-loaded as part of the television receiver IC boot-up. In one implementation, the host-controller 101 manages the code-loading operation, retrieving operating program code from the non-volatile memory 103 then delivering the operating program code to a code-loading interface of the television receiver IC 105 (or other loading circuitry) to effect storage of the operating program code in operating memory 123. In an alternative embodiment, television receiver IC 105 may include circuitry to directly load the operating program code from the non-volatile memory into operating memory 123, thus obviating involvement of the host controller (or DMA or other circuitry) in the code-loading operation. In either case, for maximum interoperability (thus enabling application in a broad variety of host devices), television receiver IC includes a relatively low-bandwidth code-load interface so that even a moderate amount of program code requires substantial time to load. For purposes of example, the code-load interface is assumed herein to be 200 KHz I²C interface, and the overall operating program code volume is assumed to be approximately 128 kilobytes, thus establishing a code-load time of just over five seconds (i.e., assuming continuous loading at the 200 KHz rate), though a faster or slower signaling interface may alternatively be employed to load less or more operating program code.

Still referring to FIG. 1, processor 121 sequentially fetches and executes individual instructions or groups of instructions that constitute the operating program code (i.e., fetching from operating memory 123) to initialize and manage various functional circuit elements within functional circuitry 125, and also to implement various signal processing and data processing functions involved in generating video and audio outputs. As shown, the television receiver IC 105 outputs a video signal ("video out") to a multiplexer or other video-source selection circuit 131 within selector 107, and thus constitutes at least one of the sources of image data that may be used to drive display 109 (others including, for example and without limitation, video information received in connection with an analog or digital telephone signal, one or more stored video sources, still images, a graphical user interface, etc.). Television receiver IC 105 similarly outputs an audio signal ("audio out") to a multiplexer or other audio-source selection circuit 133 within selector 107, and thus constitutes at least one of the sources of audio data that may be used to drive speaker 111 (others including, for example and without limitation, audio information received in connection with an analog or digital telephone signal, one or more stored audio sources, etc.). As shown, the image and/or audio information output from selector 107 may be delivered to external video and/or audio ports (i.e., "ext video out" and "ext audio out") to enable rendering on an external device (e.g., to enable the image information to be displayed on an external monitor, and/or to enable the audio information to be rendered audible in an external speaker or other transducer).

Figure 2:
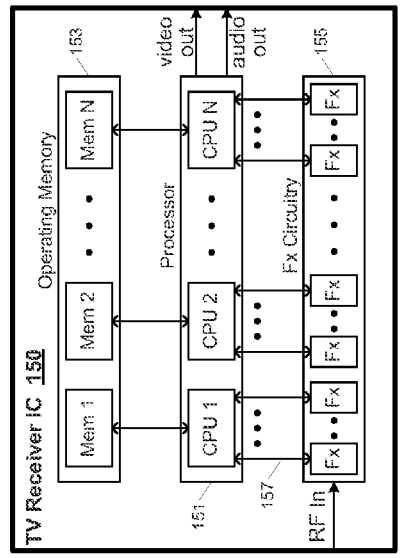
FIG. 2 illustrates an embodiment of a television receiver IC that may be used to implement television receiver IC of FIG. 1.

FIG. 2 illustrates an embodiment of a television receiver IC 150 that may be used to implement television receiver IC 105 of FIG. 1 and that includes a multi-core processor 151, multi-bank operating memory 153 and functional circuitry 155. In the embodiment shown, functional circuitry 155 includes at least one functional circuit block "Fx" coupled to receive an incoming radio-frequency (RF) television broadcast signal, and multi-core processor 151 includes respective output ports to output video-out and audio-out signals, thus effecting signal input and output ports of television receiver IC 150.

In one implementation, each storage bank within multi-bank memory 123 (i.e., "Mem 1," "Mem 2," etc.) is independently accessible and dedicated to a respective processor core (i.e., "CPU 1," "CPU 2," etc.), thus providing storage for operating program code and data for that processor core. In an alternative embodiment, any or all of the storage banks may be coupled to/shared among any two or more of the processing cores (thus forming a unified memory architecture). Conversely, any or all of the processing cores may be coupled to/shared among any two or more of the storage banks. Also, any or all of the storage banks may be consolidated into a unified storage having a single point of access (rather than the multiple access points shown), and any or all of the processing cores may be consolidated into a single processing core. In one embodiment, each of the storage banks within multi-bank memory 123 is implemented by static random access memory (static RAM or SRAM) for speed and power reasons, though dynamic RAM (DRAM) or any other type of storage technology may alternatively or additionally be used to implement any or all of the storage banks.

Still referring to FIG. 2, each of the processing cores within processor 151 is coupled to an optional number of functional circuit blocks ("Fx") within functional circuitry 155, thus providing processor control over the initialization and operation of the functional circuitry. As an example, one or more of the functional circuit blocks implements a band-pass filter to selectively pass a frequency band of interest (i.e., within the television broadcast spectrum encompassed by the incoming RF signal) to downstream circuitry. One of the processing cores (e.g., CPU 1) issues control signals to the band-bass filter to select the frequency band of interest, thus effecting a tuning or channel selection function. Any or all of the functional circuit blocks may additionally provide status information, digitized samples (e.g., obtained by a sampling operation effected by the processor core or sampling circuits within a given functional circuit block) or other information in signals returned to one or more of the processor cores (the control signal/return-signal paths being shown collectively at 157). Although each of the processing cores is depicted as issuing/receiving signals with respect to multiple functional circuit blocks (and thus controlling and/or receiving information from those functional circuit blocks), any of the processing cores may alternatively be coupled to a solitary functional circuit block or to no functional circuit blocks at all (e.g., where the processing core provides a purely data or signal processing function, such as a data decompression or decoding function).

Figure 3:
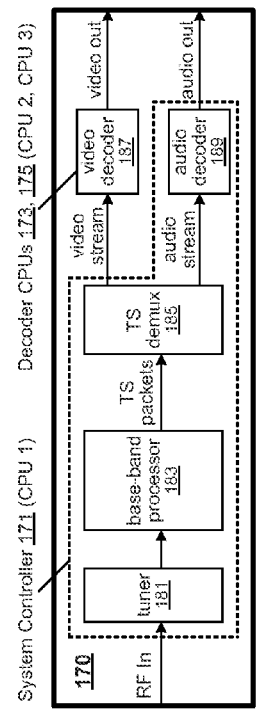
FIG. 3 illustrates an exemplary set of broadcast television signal reception and processing functions effectuated by the processor, operating memory and functional circuitry within the television receiver IC of FIG. 2.

FIG. 3 illustrates an exemplary set of broadcast television signal reception and processing functions effectuated by the processor 151, operating memory 153 and functional circuitry 155 within the television receiver IC of FIG. 2. In the particular example shown, the processor is assumed to include three processing cores, 171, 173, 175 each of which executes a respective portion of the operating program code to implement functions in connection with digital broadcast television signal reception and processing. More specifically, a system controller 171 (CPU 1) executes a first portion of the operating program code to implement a tuner 181, base-band processor 183 and transport-stream (TS) demultiplexer 185, as well as an audio decoder 189 that generates the finalized audio-out signal. Two additional "decoder" processing cores 173, 175 (i.e., "Decoder CPUs" or "CPU 2" and "CPU 3") execute respective portions of the operating program code to implement a video decoder 187 that outputs the finalized video-out signal. In general, the tuner selects a frequency band of interest within the broadcast spectrum conveyed in the radio-frequency input signal ("RF In"), and the baseband processor performs a demodulation function to deliver a packetized baseband signal (i.e., a stream of packets or transport-stream (TS) packets) to the TS demultiplexer. The transport stream demultiplexer distinguishes logical packet streams conveyed in the baseband signal based on identifying information (e.g., program identifiers or PIDs) in the packet headers, forwarding the payloads of respective, selected streams to the video decoder 187 and audio decoder 189 (i.e., forwarding the payloads of a selected video packet stream to video decoder 187 and the payloads of a selected audio packet stream to audio decoder 189). In one embodiment, video decoder 187 decodes the encoded video information conveyed in the video payload stream (the "video stream") in accordance with a video encoding/decoding standard (e.g., MPEG, H.264, etc.) to generate the finalized video output signal ("video out"), and the analog decoder 188 similarly decodes the encoded audio information conveyed in the audio payload stream (the "audio stream") in accordance with an audio encoding/decoding standard (e.g., AAC, MP3, etc.) to generate the finalized audio output signal ("audio out").

Still referring to FIG. 3, more or fewer processing cores may be allocated to perform the various television signal reception and processing functions (including functions other than those specifically shown in Figure) in alternative embodiments. Also, the functions may be allocated differently between the processing cores provided and may even be shared among two or more processing cores or dynamically allocated to different processing cores or sets of processing cores to effect load balancing.

Figure 4:
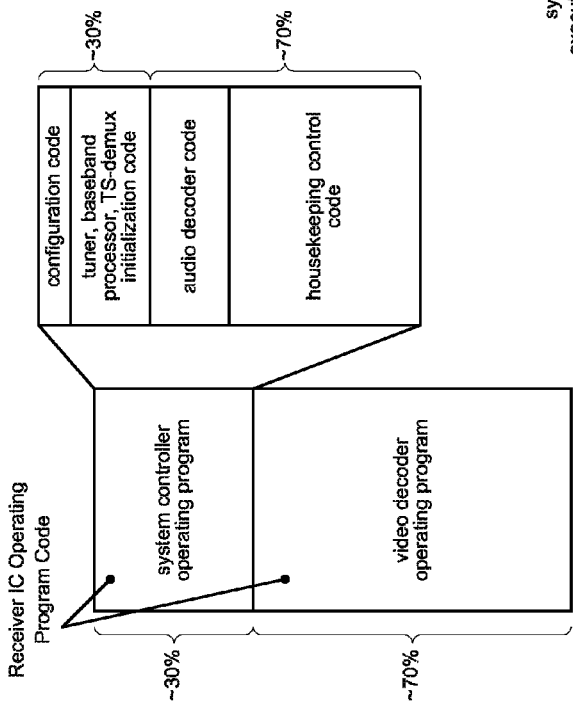
FIG. 4 illustrates an exemplary division of the overall operating program code between the system controller and the video-decoder processing core(s) within the television receiver IC of FIG. 3.

FIG. 4 illustrates an exemplary division of the overall operating program code between the system controller and the video-decoder processing core(s) within the television receiver IC of FIG. 3. As shown, the system controller operating program constitutes a minority of the total operating program code (i.e., approximately 30% in this example), and the video decoder operating program constitutes the majority of the total operating program code (approximately 70%). Moreover, within the system controller operating program, approximately 30% of the program code relates to configuration of the receiver IC and initialization of the tuner, baseband processor and TS demultiplexer, with the remaining 70% relating to the audio decoder function and housekeeping control.

Although different allocation percentages may apply, the overall percentage of the program code required to configure the television receiver IC for operation and to initialize the tuner, baseband processor and TS demultiplexer is limited to approximately 10% of the total operating program code in the example shown. Accordingly, in one embodiment, the operating program code for the television receiver IC is organized to enable the portion of the program code required for IC configuration and physical signal processing (i.e., initialization and operation of the tuner, baseband processor and TS demultiplexer, also referred to herein collectively as the "PHY") is loaded into the operating memory first (i.e., before the remaining portion of the operating program is loaded), and execution of such "start-up" program code is commenced to effectuate the configuration and PHY initialization concurrently with download of the remaining operating program code. By this operation, the time required for receiver IC configuration and PHY initialization operations are effectively hidden under the code download time (or, from an alternative perspective, a portion of the code download time is hidden under the time required to configure the IC and initialize the PHY). Further, to the extent that the IC may be configured and the PHY initialized before the operating program code download is completed, delay in connection with receiving critical rendering information (e.g., awaiting reception of an I-frame in a digital television broadcast), may also be partially or fully hidden under the code download operation.

Figure 5:
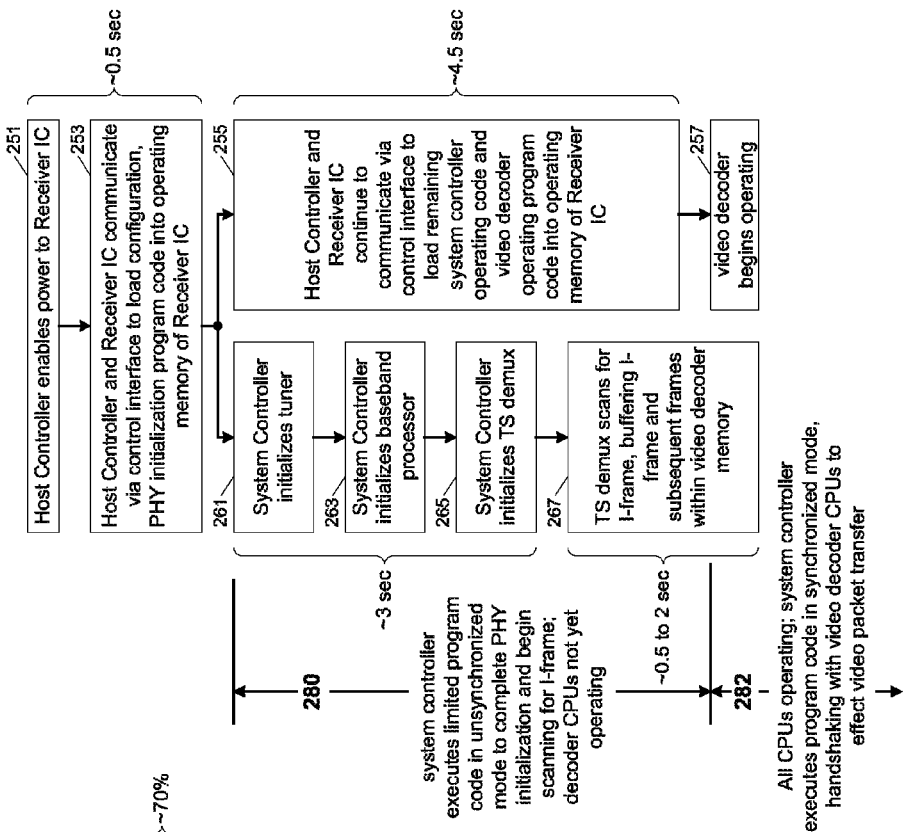
FIG. 5 is an exemplary flow diagram of an accelerated booting operation within the host device of FIG. 1.

FIG. 5 is an exemplary flow diagram of an accelerated booting operation within the host device of FIG. 1. At 251, the host controller issues signals as necessary to power-on the television receiver IC, thereby enabling communications between the host controller and television receiver IC. Accordingly, at 253, the host controller and television receiver IC communicate via a control interface to load an initial portion of the operating program code corresponding to the configuration, and PHY initialization (i.e., initialization of the tuner, baseband processor and TS demultiplexer functions shown in FIG. 3) functions into the operating memory of the television receiver IC. In one embodiment, the initial portion of the operating program code constitutes approximately 10% of the total operating program code and requires approximately half a second (0.5 sec) to download. After the initial portion of the operating program code has been loaded, the host controller and receiver IC continue to communicate via the control interface to load the remaining system controller operating program code (e.g., relating to audio decoding and housekeeping control functions), as well as the video decoder operating program code, into the operating memory of the television receiver IC. In the example shown, download of the remaining portion of the code, shown at 255, requires approximately 4.5 seconds so that the overall operating program code download time is approximately 5 seconds.

Returning to the operation at 253, after the initial portion of the program code has been loaded, the system controller is enabled to execute the loaded code in a special mode, referred to herein as "unsynchronized mode," concurrently with download of the remaining operating program code at 255. Thus, at 261, the system controller configures/initializes the tuner, for example and without limitation, by issuing control signals to tuner hardware (i.e., to the functional circuit blocks that, together with the system controller, effectuate the tuner function) to select a frequency band of interest within the incoming television broadcast signal. At 263, the system controller configures/initializes the baseband processor, for example, by issuing control signals to one or more functional circuit blocks that demodulate the RF output of the tuner (e.g., establishing a mixer frequency output from a phase locked loop or other tune-able oscillation source), perform I-Q balancing, establish filtering characteristics (e.g., of a Wiener filter or other filter), fine-tune the automatic gain control (AGC), fine-tune the center frequency of a band-pass filter implemented within the tuner and/or baseband mixer frequency (e.g., tuning the filter pass-band and/or mixer frequency according to the signal strength and/or other characteristics of the baseband signal or other signal(s) generated within the baseband processor or tuner, and thus closing a feedback loop to establish the appropriate signal gain, fine-tune the band-pass filter and/or fine-tune demodulating frequency source(s)), or any other functions required in connection with baseband processing. In the case of a digital television broadcast, configuration/initialization of the baseband processor may involve iteratively applying different demodulating parameters (e.g., modulation method, QAM size, code type, etc.) to identify the appropriate baseband demodulating scheme for a given received signal, an activity that may involve trial of many hundreds of parameter combinations and thus requiring substantial time.

Continuing with FIG. 5, at 265, the system controller initializes the TS demultiplexer, an operation which may include, for example and without limitation, constructing/updating one or more electronic program guides based on information conveyed in the baseband processor output, and selecting configuration-specified streams of packetized data to be buffered until such time as upstream components of the television receiver IC (e.g., audio decoder, video decoder) become operational. Construction of an electronic program guide may include, for example, constructing or updating one or more program map tables (PMTS) that correlate packetized data streams with respective television programs or "services" (e.g., each data stream having a respective program identifier or PID, and several such streams being provided to convey the video, audio, tele-text and other information that constitutes a given television program), and/or constructing or updating one or more program allocation tables (PATs) that correlate program map tables with respective logical channels or "sub-channels" conveyed within the physical channel selected by the tuner.

Overall, the PHY initialization effectuated in operations 261, 263 and 265 requires approximately three seconds in the example shown, and thus may be entirely hidden under the code-loading operation at 255 (i.e., performed concurrently with the code loading operation such that no additional boot-up delay is incurred due to the initialization operations 261, 263, 265). Further, as the code-loading operation is ongoing even after the PHY initialization is completed, the TS demultiplexer may begin scanning for information conveyed in the television signal and critical to video output generation within the television receiver IC. In the example shown, for instance, the TS demultiplexer begins searching for an intra-frame ("I-frame") in the incoming video stream at 267 and thus prior to completion of the code-loading operation 255, buffering any I-frame detected (and subsequent frames as necessary) within the video decoder memory for eventual processing. By this operation, when loading of the operating program code for the video decoder is completed, the video decoder memory may already be primed with image frames ready for processing. Thus, an initial I-frame and one or more subsequent frames, such as predictive frames (P-frames) and bi-directional-predictive frames (B-frames), may be detected concurrently with completion of the code loading operation at 255. And, as shown, even if the I-frame is not detected prior to completion of code-loading operation 255, at least a portion of the I-frame search time will have transpired concurrently with code-loading operation 255, thus reducing the worst-case incremental delay to detect the I-frame.

Upon completion of code-loading operation 255, the video decoder begins operating, including processing image frames that may have been pre-loaded into the memory of the video decoder (or at least loaded into a buffer for transfer to the video decoder memory), and hand-shaking with the system controller to signal readiness to receive further video streams. Accordingly, when the video decoder begins operating at 257, the system controller transitions from the unsynchronized operating mode (i.e., no or negligible interaction with other processing cores) that spans interval 280, to a synchronized operating mode (282) in which the system controller and one or more other processing cores within the television receiver IC cooperate to enable packet flow, error detection/correction/concealment operations, and so forth.

Figure 6:
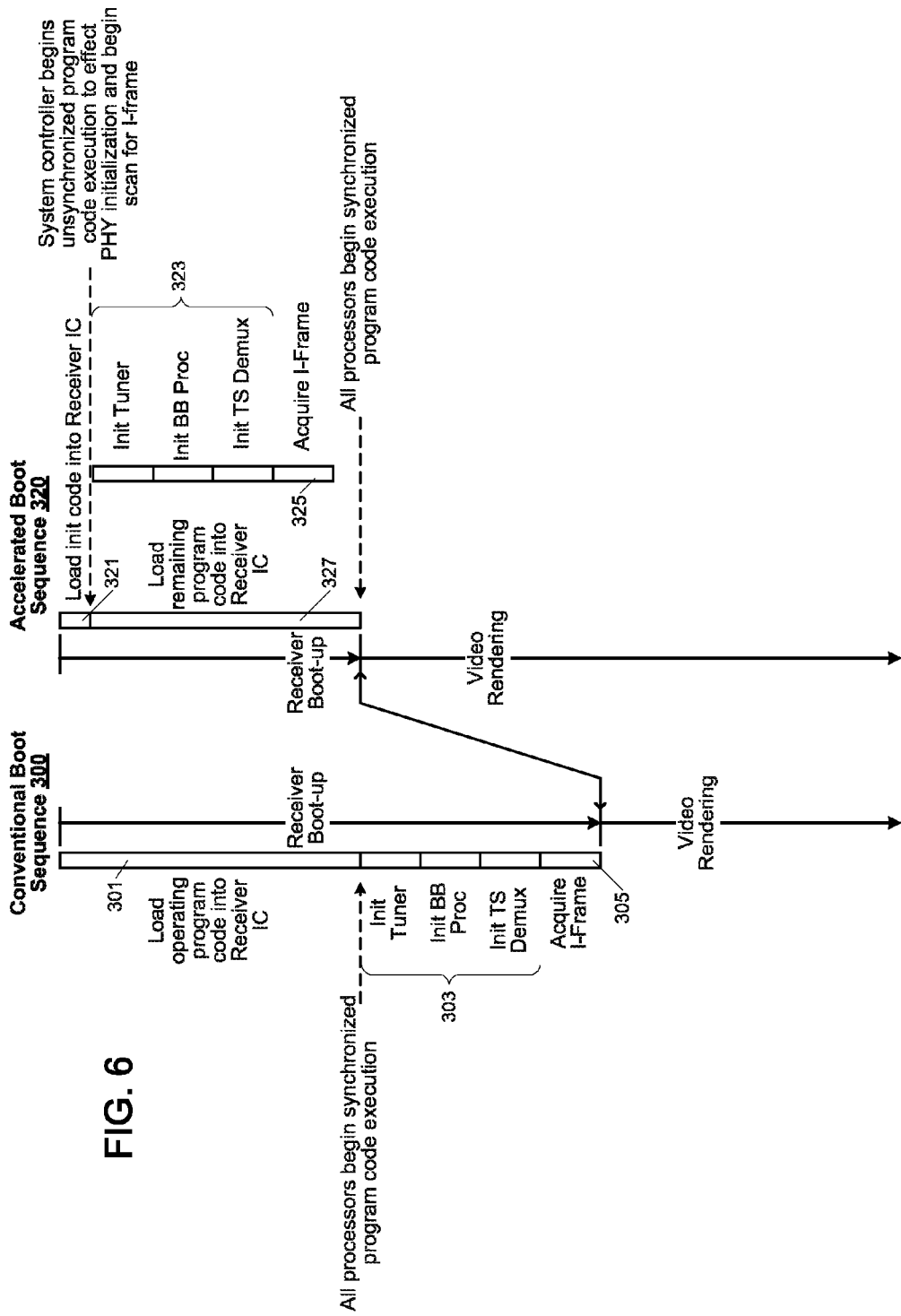
FIG. 6 contrasts an exemplary accelerated boot sequence employed within the fast-booting television receiver IC described in reference to FIGS. 1-5 with a conventional boot sequence.

FIG. 6 contrasts an exemplary accelerated boot sequence 320 employed within the fast-booting television receiver IC described in reference to FIGS. 1-5 with a conventional boot sequence 300. Starting with the conventional boot sequence, the operating program code is first loaded into the receiver IC during interval 301, followed by PHY initialization (e.g., tuner, baseband processor, TS demultiplexer) during interval 303, and then I-frame acquisition during interval 305. As shown, all processors begin synchronized program code execution together following completion of the operating program code-loading operation 301, and video rendering begins after I-frame acquisition interval 305.

By contrast, in accelerated boot sequence 320, the system controller begins unsynchronized program code execution after the configuration/initialization code (a relatively small portion of the overall operating program code) is loaded at 321, thus enabling PHY configuration and initialization 323 (i.e., configuration and initialization of the tuner, baseband processor (BB), and TS demultiplexer in this example) to be carried out concurrently with the loading of the remaining operating program code at 327. Further, as shown (and as discussed above), the system controller may begin searching for or even acquire the I-frame (or other critical rendering information) concurrently with code-loading operation 327. Through this concurrent action, a video-out signal may be output from the television receiver IC (thus enabling video rendering within the host device or a peripheral device coupled thereto) at a substantially earlier time than in conventional boot sequence 300, even though synchronized code-execution within the full complement of processing cores occurs at substantially the same time in either case. The overall boot delay may be reduced even further by storing a portion of the operating program code within a non-volatile storage within the television receiver IC, thus reducing the amount of code that needs to be loaded into the television receiver IC and correspondingly reducing the overall code-loading time. As an example, "mature" code, unlikely to require modification, may be stored in a read-only-memory or the like included within the television receiver IC (i.e., implemented/integrated on the television receiver IC die), with the processor cores or any subset of them fetching and executing program code out of the integrated non-volatile memory, the operating memory or both. Program code stored within an integrated non-volatile memory may also be transferred to the operating memory during boot-up of the television receiver IC.

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within a special purpose or general purpose processor within an electronic device or appliance, such as the host controller and/or the processor of the television receiver IC within the host device of FIG. 1 or any other embodiments described herein. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

Similarly, the various circuits and circuit blocks disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific names or numbers of signal paths, signal path widths, signaling or operating frequencies, component circuits or devices and the like may be different from those described above in alternative embodiments. Additionally, links or other interconnection between integrated circuit devices or internal circuit elements or blocks may be shown as buses or as single signal lines. Each of the buses may alternatively be a single signal line, and each of the single signal lines may alternatively be buses. Signals and signaling links, however shown or described, may be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of operation within a broadcast television receiver, the method comprising:
   loading a first portion of operating program code into a memory of the broadcast television receiver over a first time interval, the first portion of operating program code comprises executable unsynchronized program code for initializing a plurality of parameters;
   loading a second portion of the operating program code into the memory over a second time interval that succeeds the first interval, the second portion of the operating code including the executable code unrelated to initializing the plurality of parameters; and
   executing the executable program code included in the first portion of the operating program code during a third interval to initialize using the plurality of parameters for one or more functions required to present information conveyed in a broadcast television signal to a viewer, the third interval being after the first interval, at least a portion of the third interval overlapping the second interval.

2. The method of claim 1 wherein the broadcast television receiver is implemented within an integrated circuit die that includes a signaling interface to enable receipt of the operating program code from an external source, and wherein loading a first portion of operating program code into a memory of the broadcast television receiver comprises receiving the first portion of the operating program code via the signaling interface and storing the first portion of the operating program code within the memory.

3. The method of claim 1 wherein the broadcast television receiver comprises a first integrated circuit die to implement at least a portion of the memory into which the first and second portions of the operating program code are loaded and a second integrated circuit die to implement a processor that executes the instructions included in the first portion of the operating program code during the second interval.

4. The method of claim 1 wherein executing instructions included in the first portion of the operating program code to initialize one or more functions required to present information conveyed in a broadcast television signal to a viewer comprises:
   enabling operation of broadcast television signal tuning circuitry of the broadcast television receiver; and
   enabling operation of baseband processing circuitry of the broadcast television receiver.

5. The method of claim 4 wherein executing instructions included in the first portion of the operating program code to initialize one or more functions required to present information conveyed in a broadcast television signal to a viewer further comprises enabling detection of information conveyed in the broadcast television signal needed to decode encoded information conveyed in the broadcast television signal.

6. The method of claim 5 wherein enabling detection of information conveyed in the broadcast television signal needed to decode encoded information conveyed in the broadcast television signal comprises enabling detection of an intra-frame within a digital broadcast television signal.

7. The method of claim 1 wherein executing instructions included in the first portion of the operating program code during the second interval to initialize one or more functions required to present information conveyed in a broadcast television signal to a viewer comprises executing the instructions in a first processing core of the broadcast television receiver IC, the method further comprising executing instructions in the second portion of the operating program code in a second processing core of the broadcast television receiver IC.

8. The method of claim 7 wherein executing instructions in the second portion of the operating program code in a second processing core effects decoding of an encoded video signal generated by the first processing core.

9. The method of claim 1 wherein the broadcast television signal is a digital broadcast television signal.

10. A broadcast television receiver comprising:
   tuning and demodulating circuitry;
   a memory;
   interface circuitry coupled to the memory to enable a first portion of operating program code to be loaded into the memory over a first time interval, and to enable a second portion of the operating program code to be loaded into the memory over a second time interval that succeeds the first interval, wherein the first portion of operating program code comprises unsynchronized executable program code for initializing a plurality of parameters, and, the second portion of the operating code including the executable code unrelated to initializing the plurality of parameters; and
   a processor coupled to the tuning and demodulating circuitry and coupled to the memory to fetch instructions included in the first portion of the operating program code therefrom, the processor to execute the executable program code for initializing a plurality of parameters included in the first portion of the operating program code during a third interval to enable and initialize using the plurality of parameters the tuning and demodulating circuitry to receive and demodulate a broadcast television signal, the third interval being after the first interval, at least a portion of the third interval overlapping the second interval.

11. The broadcast television receiver of claim 10 wherein the tuning and demodulating circuitry, memory, interface circuitry and processor are implemented within a first integrated circuit die.

12. The broadcast television receiver of claim 10 wherein at least a portion of the memory is implemented in a first integrated circuit die, and wherein at least a portion of the processor is implemented in a second integrated circuit die.

13. The broadcast television receiver of claim 10 wherein execution of the instructions included in the first portion of the operating program code within the processor to enable the tuning and demodulating circuitry to receive and demodulate a broadcast television signal comprises enabling the tuning and demodulating circuitry to select a frequency band of interest within a broader spectrum conveyed in the broadcast television signal.

14. The broadcast television receiver of claim 10 wherein execution of the instructions included in the first portion of the operating program code within the processor to enable the tuning and demodulating circuitry to receive and demodulate a broadcast television signal comprises enabling the tuning and demodulating circuitry to determine an encoding format of the broadcast television signal.

15. The broadcast television receiver of claim 10 wherein the processor further executes the instructions included in the first portion of the operating program code to enable detection of information conveyed in the broadcast television signal needed to decode encoded information conveyed in the broadcast television signal.

16. The broadcast television receiver of claim 15 wherein execution of the instructions included in the first portion of the operating program code within the processor to enable detection of information conveyed in the broadcast television signal needed to decode encoded information conveyed in the broadcast television signal comprises enabling detection of an intra-frame within a digital broadcast television signal.

17. The broadcast television receiver of claim 10 wherein the processor comprises a plurality of processor cores, and wherein execution of the instructions included in the first portion of the operating program code within the processor to enable the tuning and demodulating circuitry to receive and demodulate a broadcast television signal comprises execution of the instructions in a first processing core of plurality of processor cores, and wherein instructions included in the second portion of the operating program code are executed at least, in part, by a second processing core of the plurality of processor cores.

18. The broadcast television receiver of claim 17 wherein execution of the instructions included in the second portion of the operating program code within the second processor core effects decoding of an encoded video signal generated by the first processing core.

19. The broadcast television receiver of claim 10 wherein the broadcast television signal is a digital broadcast television signal.

20. A mobile device comprising:

a non-volatile memory to store operating program code;

a radio-frequency input to receive a broadcast television signal;

a television receiver integrated circuit to generate a video signal based, at least in part, on the broadcast television signal, the broadcast television receiver including:

tuning and demodulating circuitry;

an operating memory;

interface circuitry coupled to the memory to enable a first portion of operating program code to be loaded from the non-volatile memory into the operating memory over a first time interval, and to enable a second portion of the operating program code to be loaded from the non-volatile memory into the operating memory over a second time interval that succeeds the first interval, wherein the first portion of operating program code comprises unsynchronized executable program code for initializing a plurality of parameters, and, the second portion of the operating code including the executable code unrelated to initializing the plurality of parameters; and a processor coupled to the tuning and demodulating circuitry and coupled to the operating memory to fetch instructions included in the first portion of the operating program code therefrom, the processor to execute the executable program code for initializing a plurality of parameters included in the first portion of the operating program code during a third interval to enable and initialize using the plurality of parameters for the tuning and demodulating circuitry to receive and demodulate a broadcast television signal as part of generation of the video signal, the third interval being after the first interval, at least a portion of the third interval overlapping the second interval; and a display to receive the video signal from the broadcast television receiver and display images conveyed therein to a viewer.

21. A broadcast television receiver comprising:

a memory;

an interface for receiving video signals;

means for loading a first portion of operating program code into the memory over a first time interval, the first portion of the operating program code including unsynchronized executable code for initializing a plurality of parameters;

means for loading a second portion of the operating program code into the memory over a second time interval that succeeds the first interval, the second portion of the operating program code including decoding codes for processing the video signals; and means for executing instructions included in the first portion of the operating program code to initialize at least the plurality of parameters during a third interval to initialize one or more functions required to present information conveyed in a broadcast television signal to a viewer, the one or more functions including at least decoding the video signals using the decoding codes, the third interval being after the first interval, at least a portion of the third interval overlapping the second interval.

* * * * *